United States Patent [19]
Manthey

[11] Patent Number: 4,829,450
[45] Date of Patent: May 9, 1989

[54] REASONING MACHINE

[76] Inventor: Michael Manthey, Otte Rucsvej 10, 5220 Odense SO, Denmark

[21] Appl. No.: 834,535

[22] Filed: Feb. 28, 1986

[51] Int. Cl.$^4$ .............................................. G06F 15/18
[52] U.S. Cl. ................................................... 364/513
[58] Field of Search ... 382/15; 364/513, 200 MS File, 364/900 MS File

[56] References Cited
PUBLICATIONS

Hierarchy in Sequential and Concurrent Systems; Michael Manthey; Computing Research Laboratory; New Mexico State University; MCCS-86-51.

Primary Examiner—Jerry Smith
Assistant Examiner—Allen MacDonald
Attorney, Agent, or Firm—Mark E. Ogram

[57] ABSTRACT

A computer system which learns or assimilates its experience into a hierarchical arrangement. The current set of events, represented as a general directed graph of nodes and arcs, is incorporated into a memory. After each observation or input, the resulting graph is analyzed to determine if any cycles exist. Each cycle is reduced to a single node. This collapsing of the graph creates a hierarchial arrangement of the past events. Each successive level of hierarchy, by burying the details, is a more generalized model of the past experiences. In this manner, not only are computational and memory requirements reduced, but, the computer system will learn from past events which to permit use in such applications as robotics or general operator inquiry and interaction.

35 Claims, 2 Drawing Sheets

CYCLE T-d-T REDUCED TO T'
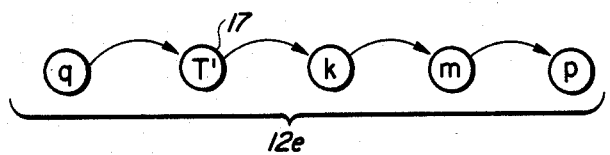
Fig-1e
Fig-2a
```
  b - d
  d - n
  n - k
20 k - m  21
   m - p
23 p - ∅  22
```
Fig-2b
```
24  b - d,t  25
    d - n
    e - r
    k - m
    m - p
    n - k
    p - ∅
    r - b
    s - e
    t - ∅
```
Fig-2c
```
  a - n
  b - d,t
  d - n
  e - r
  f - s
  k - m
  m - p
  h - k,f
  p - ∅
  q - t
  r - b
  s - c
  t - a
```
Fig-2d
```
26
T:(t-a-n-f-s-e-r-b-t)-d,k
       d - T
       k - m
       m - p
       p - ∅
       q - T
```
Fig-2e
```
27  T':(T-d-T)-k
       k - m
       m - p
       p - ∅
       q - t
```
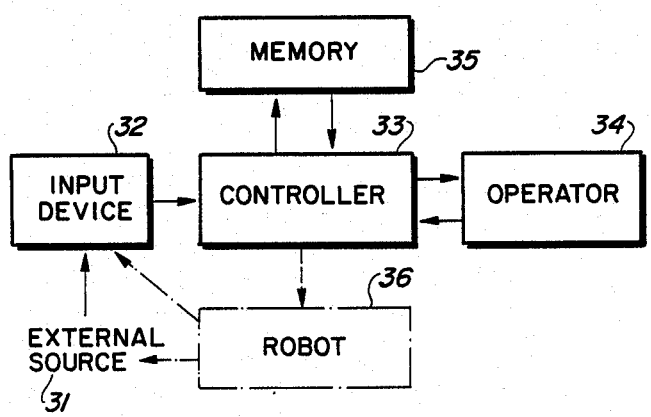
Fig-3
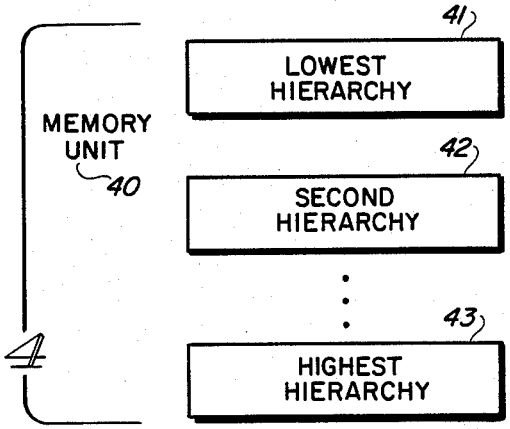
Fig-4

REASONING MACHINE

BACKGROUND

This invention relates generally to computer systems and specifically to systems which can assimilate current activities into its memory.

Ever since the computer was first developed, it has been touted as a "thinking" device. In fact, early hesitancy to use computers was the result of fear that the computer could out-think its owner.

As the use of computers spread, the magical attributes of the computer were debunked. It was soon recognized that the computer was only as smart as the programmer. The computer was a tool that could be used only for very definite tasks; and, these tasks had to be completely understood by the programmer.

The need for a machine which could do more than number crunch or manipulate verbiage became more pronounce and a variety of rudimentary skills were subsequently incorporated into the computer. One of these skills included Computer Aided Engineering (CAE). Although computers which had this ability could perform some rudimentary engineering (i.e. find an efficient connection path between components), the computers were still only as intelligent as the designer. That is, the machine was no more efficient after years of operation than it was on its first day. The experience which it had gained was not stored, analyzed, or assimilated.

Presently some more work has been performed in creating "Expert Systems". These are computer systems which are designed to perform a particular function such as the legal practice of drafting a will or medical diagnosis. As with CAE though, the "Expert System" does not gain or improve upon itself with added experience without human intervention into its underlying principals and knowledge base.

Still another concept which has been used is described in the paper entitled "Hierarchy in Sequential and Concurrent Systems", by Michael Manthey, and published by the Department of Computer Science at the University of New Mexico.

In the Manthey approach, an entire universe of knowledge concerning the physical world's structure and interaction is formed into a directed graph of nodes and arcs. Each node is representative of an action, the arcs are representative of the "leadsto" relation. That is, the arcs define the sequence with which the actions occur. Using a special algorithm, the computer then identifies cycles in the directed graph and collapses the chosen cycle into a single nodal representation. This new composite node is in essence a summary of the cycle.

In this approach though, knowledge of the entire universe for the system must be given a priori. That is, all knowledge about all possible actions and their interrelationships must be known before any computer extraction or generalization may be done. In the real world, this idyllic situation does not exist since knowledge about the system is gathered piecemeal.

It is clear from the foregoing that a need does exist for a system which can learn through experience; what is needed is a system that can collate data into the best knowledge available at the time. This knowledge then could assist the human operator in evaluation of the environment or assist another device in its activities.

SUMMARY OF THE INVENTION

It is clear from the forgoing that a system does not exist which will "learn" from experience. That is one which will utilize not only present data but also data from the past to respond as fully as possible to an existing problem.

In the present invention, a memory unit or device contains a graphical representation of the events which have occurred. A graph, being a directed arrangement of nodes and arcs, illustrates the interrelation of past activities (the nodes) and their interrelationship (the arcs or "leadsto" relation). Via an input device, a present set of events is incorporated into the existing graph.

The resulting graph is analyzed to identify paths which form cycles. Each cycle is identified and some are chosen. These chosen cycles are then represented in a higher hierarchical graph as single nodes. The remaining nodes and arcs remain the same.

It is important to note that although a new node (representing a cycle) does not show the details of the cycle(s) it represents, it does contain a synthesization of the knowledge of the cycle.

This synthesis of the original graph is preferably taken onto higher hierarchical graphs until no cycles exist. The highest hierarchical graph is obviously the most general of the graphs and therefore allows the most basic questions to be addressed. If the details are necessary, then the computer or the operator may descend through the hierarchy and reveal the details formerly hiden by the higher levels.

With the knowledge contained in the graph hierarchy, the reasoning machine may address problems posed by an operator, or it may use its knowledge to control the operation of one or more separate device such as robots. In the case of a robot, it is important to note that the activities of the robot, which is responding to the control of the reasoning machine, is creating "activities" which will act as further input to the reasoning machine; thereby, creating at least partially, a feedback to the reasoning machine.

In the case of analysis of operator input relative to the graph hierarchy, the reasoning machine may determine if it is possible to obtain a particular objective based upon its own perceived past experiences. Synthetic "past experiences" could also be entered into the machine's memories to provide for an initial memory or "experiences".

DETAILED DESCRIPTION OF INVENTION

The core of the reasoning machine consists of an input device for the receipt of data, a memory device for the storage of data, and a control means.

The control means will accept data via the input device. This data is representative of a set of related events. Although this set may have occured some time past, it is generally refered to as "New Events" since it represents the newest input. The set of events is represented within the reasoning machine as a directed graph.

A directed graph is any representation which incorporates the concept of nodes and directed arcs. The directed arcs indicate possible movement from one node to ("leadsto") another node and not vice versa (unless another arc allows such movement). Although graphs are most commonly known in illustrations, those of ordinary skill in the art readily recognize various methods to store such graph in memory.

The graph of the New Events is incorporated into the existing graph within memory. The memory used for storage of the graphical representation is initially void; hence the first graph is incorporated into a null graph existing in memory. Thereafter, the New graph is incorporated into a non-null graph.

In one embodiment of the invention, the input device is constantly accepting data indicative of individual nodes. These nodes, which are sequential by their time relationship, are therefore constantly added to the graph. This web-building of the graph is extremely useful where analysis of the activities of a single entity is wanted. In this case, the input of the sequential activities is continuous and is only "broken" into segments by the reasoning machine's need to collate the graph periodically. An example of this particular type of input situation is where the reasoning machine is analyzing the movement of a lab animal within an open space.

Once the New graph is incorporated into the existing graph, the resulting graph is analyzed to determine if any cycles exist. Should several cycles exist, the control means will choose one of these cycles and form a higher hierarchical graph which is identical to the original, except that the higher hierarchical graph has the chosen cycle(s) represented as a single node(s). This newly formed hierarchical graph is then anyalzed for cycles and, should these exist, the same procedure is performed on it to form a still higher hierarchical graph should a cycle exist. The procedure of forming higher hierarchical graphs is terminated only when no suitable cycles are identified.

The preferred method of choosing particular cycles to be replaced by single nodes is to generate a list, L, of all cycles in the graph, and to choose from this list, the largest sublist of cycles that are not directly coupled. Each cycle within the sublist is then represented as a single node.

Other alternative methods for selection of cycles for reduction are available such as the selection of cycles in which a selected property is conserved. The conservation property is preferably supplied by the operator or calculated by the reasoning machine.

The use of the directed cycles of the system graph as the basic element in defining a hierarchy relation has several attractive properties. First, they are a topologically invariant, objective property of the graph. Second, they allow naturally for non-terminating event sequences, which are typical of any system which is not supposed to ever terminate. Third, and most important, cycles represent the only path by which non-consumable resources can be conserved in a system. Points of dynamic stability are also found in cyclic structures, just as a vortex is a point of dynamic equilibrium in a river.

We define a conserved resource to be any resource for which the relationship $c = c_0 + \Sigma$ deallocations $- \Sigma$ allocations, where $c_0$ is the initial amount and $c$ the current amount of the resource, holds for the life of the system. The relationship between cyclicity and conservation is most easily seen in the case of a simple binary semaphore, where a wait-operation results ultimately (presuming no deadlock or starvation) in allocation of the resource in the form of permission to use it. The subsequent signal operation on that same semaphore deallocates the resource by relinquishing the permission. There is clearly a directed cycle from wait to signal.

A less abstract example of the cyclicity of resource conservation is a company which rents cars. If they insist that customers always return the car to the particular location from which they originally rented it, then an observer of the company's parking lot could eventually conclude that the number of cars (barring accidents) was conserved. If customers are however are allowed to drop off a car at a different company location, the observation of any one of the lots would not give any reason to infer conservation. Cars would appear to come from apparently inexhaustible sources, and disappear unaccountably into sinks. If one connected these sources and sinks together, i.e., enlarged the bounds of the system under consideration, then the conservation would be observed at a higher level, where "level" is understood in the sense of $H_{cyc}$.

The $H_{cyc}$ hierarchy is built out of the shared conserved resources in a system, and is based on the observation that a (re-usable) resource is one whose amount is conserved over time. Conservation of resource cannot occur without a cyclic message-passing relationship among the system components, although conservation is not thereby guaranteed. The cycle represents the return of the "access right" to the issuing "resource manager". An algorithm for calculating the conservation-determining resource invariants was described in the article "Synthesis of Resource Invariants for Concurrent Programs" by Clarke Jr, ACM TOPLAS 2,3 1980. Although this algorithm is defined for the restricted class of concurrent computations specifiable by some number of individually cyclic processes, it appears that a large number of practical systems nevertheless are covered, especially if one treats a sequential process as one which loops zero times, just as an aperiodic function is considered to be periodic for the purposes of Fourier analysis.

With this background, the algorithm for constructing $h_{cyc}$ on an arbitrary system graph G, which at each level is the same as calculating the maximum set of cyclic subgraphs $G_i$, is as follows: Denote by $C_0 = (c_0, c_1, \ldots c_n)$ the set of all cycles of $G_0$. $C_0$ empty implies the $h_{cyc}$ doesn't exist. Notice that each $c_i$ is an equivalence class of potentially resource-conserving processes. Construct from $C_0$ the maximal subsets of mutually disjoint cycles to obtain the set $M_0$. The maximality criterion establishes "least importance", since it favors local cycles over global ones; it also embodies the third hierarchy criterion, that of building up the hierarchy as slowly as possible.

Consider an element $m_j \epsilon M_0$. then $m_j = \{c_k, c_1, \ldots, c_n\}$. The mutual disjointness criterion means that each of the $c_1 \epsilon m_j$ shares no nodes with any of the other c's in $m_j$. Since they are only indirectly coupled via ars external to them, each cycle can be individually considered. If the processes in the cycle equivalence class conserve any resources, then replacing the cycle by a single node will simply bury a behavior which cannot be seen from outside the cycle anyway. As long as no other behavior is buried, but rather used to characterize the new node, the description of a system whose graph has been so condensed will remain accurate.

If $M_0$ contains more than one maximal set, this can only mean that some cycles are shared by different $m_j$'s. Said differently, there exist cyclic subgraphs. It is not possible to find any way to pick apart such closely coupled processes, and so our algorithm simply conjoins the associated equivalence classes. If the cyclic subgraph conserves resources, then it is condensed as if it were a simple cycle.

When all the conservative cyclic subgraphs in $M_0$ have been condensed to single nodes, it is the most detailed level of abstraction of the system.

Once the hierarchical arrangement has been formed, analysis of the machine utilizes the uppermost hierarchical graph for initial inquiry and will work its way down through the hierarchy to expose selected details as they are needed.

In one embodiment of the invention, the operator is provided with an input device which permits the operator to pose certain postulates to the reasoning machine. The reasoning machine analyzes these postulates relative to the hierarchy and advises the operator, via an output device, of the relationship of the postulate relative to the activities so far observed as embodied by the graph.

In still another embodiment of the invention, the reasoning machine is in communication with an external device. This external device, such as a robot, at least partially, is controled by the reasoning machine. A set of objectives is defined for the reasoning machine either via operator input or via a predefined set of data within memory ("objective" data).

The reasoning machine utilizes this objective data in its analysis of the hierarchical arrangement in determining the actions to be taken by the robot. Note that in this case, the actions of the robot will preferably constitute some of the input for incorporation in the graph. In this manner, the reasoning machine, based upon its knowledge to that time, will cause the robot to act in a particular manner; the robot's action together with the accompanying reactions, are used for future analysis since this activity sequence now constitutes a new set of input data. Hence, the reasoning machine coupled with the robot will "try" different activities, observe their result, and modify future activities based upon this "trial and error" approach. The system will not repeat "errors" and therefore learns from experience.

The invention, together with its embodiments will be more fully described by the accompanying drawings and their accompanying descriptions.

DRAWINGS IN SUMMARY

FIGS. 1a, 1b, 1c, 1d, and 1e illustrate in graphical form, the concept of identifying cycles and reducing the cycle to a single node representation.

FIGS. 2a, 2b, 2c, 2d, and 2e illustrate the transition within memory of the example first illustrated in FIGS. 1a, 1b, 1c, 1d, and 1e.

FIG. 3 is a block diagram of an embodiment of the invention illustrating the interaction of the components.

FIG. 4 is a block diagram of the hierarchical arrangement of the memory unit.

DETAILED DESCRIPTION OF THE DRAWINGS

Figure 1A:
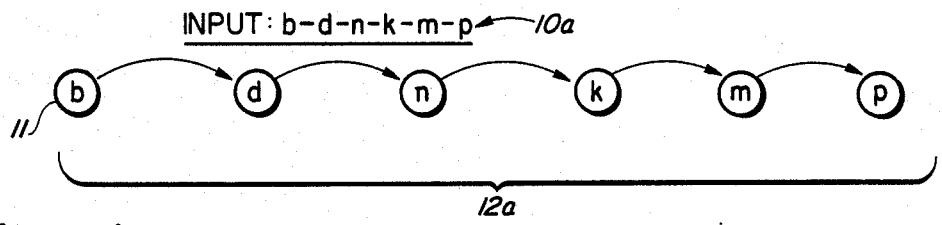

Referring to FIG. 1a, the initial input 10a, begins with activity b, 11, followed sequentially thereafter by d, n, k, m, and finally p. The directed graph 12a, is representative of this sequence. Note that in a directed graph, the direction of the arc indicates the sequential order of the nodes. That is, it is possible to "walk" from d to n to k, but not k to n to d.

Figure 1B:
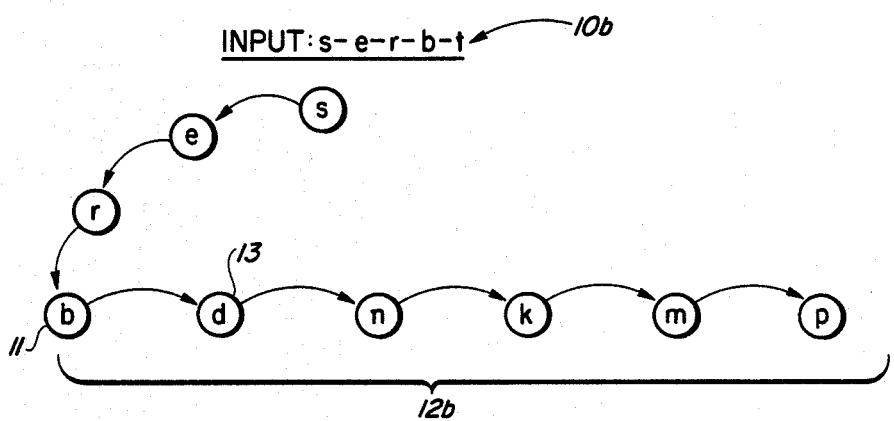

Analysis of the graph 12a indicates that there are no cycles, hence the next input, 10b, is incorporated into graph 12a forming graph 12b as illustrated in FIG. 1b.

In input 10b, the activity b has already been defined so node 11 is common to both sequences. As illustrated in FIG. 1b, experience from the two input sequences has shown that either activities d, node 13, or t, node 14 may have come after activity b, node 11.

Figure 1C:
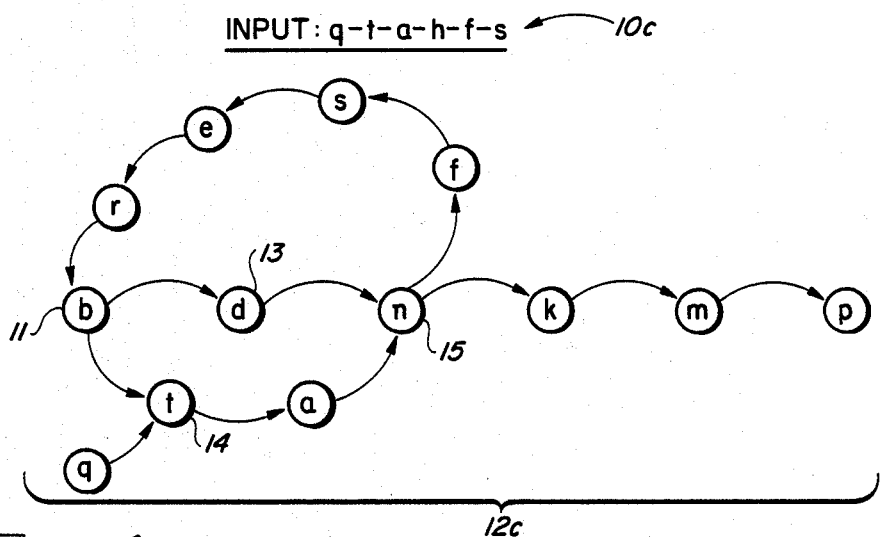

No cycles exist in graph 12b. New input 10c is accepted and incorporated into graph 12b to form graph 12c as illustrated in FIG. 1c. As discussed before, the sequential input 10c is incorporated into the graph such that common activities are represented as a single node. As illustrated in FIG. 1c, nodes 14 (representing as a "t") and node 15 (representing an "n") have occured in the past.

Figure 1D:
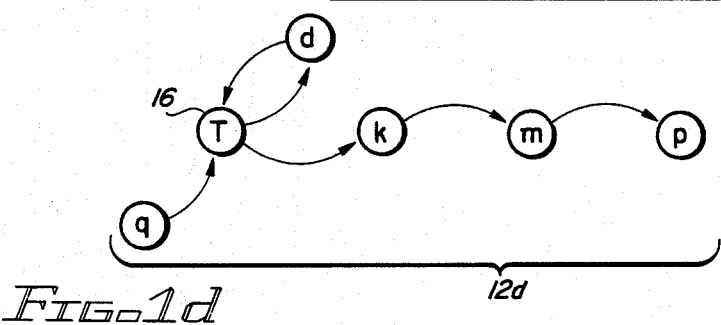

Note that now, graph 12c has two cycles. The two non-disjoint cycles are analyzed and the cycle composed of t-a-n-f-s-e-r-b-t is chosen according to the algorithm previously discussed. This cycle is reduced to a single nodal representation of "T", node 16 as illustrated in FIG. 1d. Note that this significantly simplifies the representation from graph 12c. Graph 12d, although lacking the detail of graph 12c, still maintains all of the knowledge of 12c.

Even though graph 12d is significantly reduced, a cycle still exists of T-d-T. This cycle is reduced to "T'", node 17 of graph 12e as illustrated in FIG. 1e.

Graphs 12c, 12d, and 12e represent a hierarchical arrangement of the base knowledge contained in graph 12c. In one embodiment of the invention, all three graphs are stored in memory.

FIGS. 2a, 2b, 2c, 2d, and 2e illustrate the memory transformation which mirrors the graphical illustrations of FIGS. 1a, 1b, 1c, 1d, and 1e respectively.

Since the initial memory is blank, the initial input sequence 10a of b-d-n-k-m-p is stored in memory as a series of pairs as illustrated in FIG. 2a. Because of the directed nature of the graph, each node of the graph is defined by which nodes are connected by arcs or "leadsto". Hence, m, 20, is connected to p, 21. That is, movement may occur from m, 20, to p, 21. Note that p, 21, being a terminating node does not leadsto any other node, its memory is represented as a blank 22.

With the addition of the new input 10b, described in FIG. 1b, the memory is altered to that illustrated in FIG. 2b. New nodes are given memory space and any nodes which have been used previously have the new leadsto node defined in memory. As example, node b, 24, now leadsto nodes d and t, 25.

As discussed with regards to FIG. 1b, the memory of 2b is evaluated to determine if a cycle exists before the next input is incorporated into memory. Those of ordinary skill in the art readily recognize several methods of determining if cycles do exist.

Input 10c is then incorporated into the memory as illustrated in FIG. 2c. As illustrated in FIG. 2b, nodes which have not been encountered before are allocated memory locations while previously encountered nodes simply are noted by indicating new leadsto relations.

The graph represented by FIG. 2c contains the same cycles which were illustrated in FIG. 1c. The cycle t-a-n-f-s-e-r--b-t is therefore reduced to a single nodal representation, 26, "T" as illustrated in FIG. 2d. This nodes contained in this cycle are no longer represented in the higher hierarchial memory illustrated in FIG. 2d.

Since the graph represented by FIG. 2d still contains a cycle, an even higher hierarchial graph must be created in memory. This new graph, illustrated in FIG. 2e, reduces the cycle T-d-T into the nodal representation 27, T'.

It is clear that in this manner, the memory is arranged into a hierarchical arrangement whereby the uppermost hierarchial segments are more general while the lower hierarchical segments contain more detail. In the example of the FIG. 2 series, the graph as stored in FIG. 2e is more general than the graph of FIG. 2d, which is more general than the graph of FIG. 2c.

Problems which must be analyzed, will first address themselves to the graph of FIG. 2e; upon finding a solution to the problem, the specifics of the solution will be disclosed by revealing the details of hierarchical underlying memory segments.

As example, suppose the problem is posed, "Is it possible to move from node q to m? Specify." The answer is readily apparent that it is possible from the graph represented in memory illustrated in FIG. 2e. But the specifics are not presented there. By revealing the lower hierarchical memories of FIGS. 2d and 2e, it becomes apparent that to move from q to m will require the sequence of actions q-t-a-n-k-m.

In a similar situation, should the problem posed by "Is it possible to move from k to q? Specify." analysis of the graph stored in memory illustrated in FIG 2e would indicate that the answer is "no" and therefore, the present art's method of analyzing all the possible paths of FIG 2c would be avoided.

FIG. 3 is a block diagram of one embodiment of the invention. An external source 31 communicates the sequence of events to the controller 33 via the input device 32. Although in the prefered embodiment the input device is operator controllable, alternative embodiments allow the input device to be another electronic, electrical, or a mechanical device. An example of an electronic device would be electronic sight associated with robotics.

The controller 33, is preferably a computer although other devices are obvious to those of ordinary skill in the art.

Controller 33 adjusts the graphical representation stored in memory 35. Memory 35 is preferably a Random Access Memory (RAM) but other memory devices are obvious to those of ordinary skill in the art.

The operator interface 34, permits the posing of questions to the controller 33 for analysis relative to the graph stored in memory 35. In the preferred embodiment, the operator interface 34 is a Cathode Ray Tube (CRT) with keyboard. The controller 33 communicates to the operator, via operator interface 34, data indicative of the analysis of the question relative to the existing graph within memory 35.

In one embodiment of the invention, a robot 36 is controled by controller 33. Controller 33 utilizes either prestored "objective" data, that is data indicative of a particular objective, or operator defined objective data in its analysis with the graph within memory 35. This analysis will determine what action should be taken by optional robot 36.

The actions of robot 36 serve as input to input device 32 and therefore constitute, at least some, of the input data used by controller 33 in defining the graph in memory 35. In this way, a semi-closed loop arrangement exists which will allow the device to analyze past events, choose a particular action, and incorporate this action with its attendant results into its memory for future reference and analysis.

Examples of robots for this type of situation would be walking robots, manufacturing robots, and the like. Those of ordinary skill in the art will recognize other robotic applications.

In FIG. 4, the memory unit 40 is illustrated in its hierarchial arrangement. The lowest ranking hierarchy level 41 will help define the graph to be stored in the second hierarchical memory level 42 which continues on to the highest hierarchical memory level 43.

It is clear from the foregoing that the present invention permits the creation of a reasoning machine; that is, a machine which will use its past experiences to address present problems. The prior description is not intended to be limiting upon the invention which is defined in the accompanying claims.

What is claimed is:

1. A computer system comprising:
   A. a memory means for storage of data;
   B. input means for receiving current data being representable as a directed graph; and
   C. control means for:
      1. combining said current data with any existing data in said memory means, said existing data being sequential in nature;
      2. determining if a cycle exists in said combined current data and existing data; and,
      3. Storing in said memory, new data representive of the combined current data and existing data wherein said determined cycle is represented as a single datum point.

2. The computer system according to claim 1 where said control means further comprises means for determining if a cycle exists in said new data.

3. The computer system according to claim 2 where said control means includes means for repetitively:
   A. determining if a cycle exists;
   B. for storing said new data; and
   C. for permitting current data via said input means only when no cycle exists in said new data.

4. The computer system according to claim 1 wherein said input means includes input means for operator generated data input.

5. The computer system according to claim 4 wherein said control means includes means for comparing the operator generated data with said new data.

6. The computer system according to claim 5 further comprising an output means and wherein said control means includes means for communicating via said output means, data indicative of the comparison of said operator generated input and said new data.

7. The computer system according to claim 1 further comprising at least one robotic device and wherein said control means further comprises means for:
   A. comparing said new data with predefined objective data; and,
   B. manipulating said robotic device based upon said comparison of said new data and said predefined objective data.

8. The computer system according to claim 7 wherein data indicative of the manipulation of said at least one robotic device comprises a component of said current data.

9. The computer system according to claim 8 further comprising means for updating said predefined objective data.

10. The computer system according to claim 9 wherein said predefined objective data is stored in said memory means.

11. A system for assimilating actions comprising:
   a. memory means for storage of a graph representation, said graph having nodes and connecting arcs;

b. means for defining within said memory means a graph representative of past activities;

c. means for incorporating a graph representative of current activities into said existing graph, thereby creating a new graph within said memory;

d. means for identifying cycles existing in said new graph;

e. means for selecting one of said identified cycles; and f. means for creating, within said memory means, a higher hierarchical graph, said higher hierarchical graph being identical to said new graph except that said selected cycle is represented as a single node.

12. The system according to claim 11 further comprising means for determining if a cycle exists in said higher hierarchical graph within said memory.

13. The system according to claim 12 further including means for repetitively:

A. determining if a cycle exists in the highest hierarchical graph;

B. for creating an even higher hierarchical graph by reducing the determined cycle to a single node; and C. for permitting the incorporation of the graph representative of current activities only when no cycle exists in the even higher hierarchical graph.

14. The system according to claim 11 further including input means for operator generated data.

15. The system according to claim 14 further including means for comparing operator generated data with said highest hierarchical graph.

16. The system according to claim 15 further comprising an output means and means for communicating via said output means, data indicative of the comparision of said operator generated data and said highest hierarchical graph.

17. The system according to claim 11 further comprising at least one robotic device and further comprising means for:

A. comparing said highest hierarchical graph with a predefined objective data; and, B. manipulating said at least one robotic device based upon said comparison.

18. The system according to claim 17 wherein data indicative of the manipulation of said robotic device comprises a component of said graph representation of current activities.

19. The system according to claim 18 further comprising means for updating said predefined objective data.

20. The system according to claim 19 wherein said predefined objective data is stored in said memory means.

21. An intelligent system comprising:

A. a memory having a plurality of memory sections, each of said memory sections initially being empty, and each of said memory sections having hierarchical relationship to the other memory sections;

B. input means for receipt of event data which is representable as a directed graph; and C. means for,
  1. accepting new event data from said input means,
  2. creating a graphical representation consisting of nodes and arcs representative of said new event data,
  3. incorporating said graphical representation into any existing graph stored in the lowest hierarchical memory section, and
  4. creating for each successive hierarchical section, a graphical representation of the prior hierarchical graphical representation having selected cycles of said prior hierarchial graphical representation represented as single nodes.

22. The intelligent system according to claim 21 further comprising means for determining if a graphical cycle exists in any of said memory sections.

23. The intelligent system according to claim 22 further including means for permitting data indicative of a new sequence of events only when no graphical cycle exists in any of said memory sections.

24. The intelligent system according to claim 21 wherein said input means includes means for input of operator generated data.

25. The intelligent system according to claim 24 further including means for analyzing said operator generated data with the contents of selected memory sections.

26. The intelligent system according to claim 25 further comprising:

A. an output means; and,

B. means for communicating via said output means, data indicative of the analysis of said operator generated data and the contents of selected memory sections.

27. The intelligent system according to claim 21 further comprising;

A. at least one robotic device; and,

B. means for,
  1. analyzing the contents of selected hierarchical memory sections with predefined objective data; and,
  2. manipulating said robotic device based upon said analysis.

28. The intelligent system according to claim 27 wherein data representative of the manipulation of said robotic device comprises a component of said graphical representation of said new event data.

29. The intelligent system according to claim 28 further comprising means for updating said predefined objective data.

30. The intelligent system according to claim 29 wherein said predefined objective data is stored in said memory.

31. A method of operating a system having a memory with a plurality of memory sections, each of said memory sections initially being empty, and each of said memory sections being hierarchically arranged to each other, said system also having input means for receipt of data indicative of a sequence of events, the method of operating the system comprising the steps of:

a. accepting a new sequence of events from said input means;

b. creating a graphical representation consisting of nodes and arcs representative of said new event data;

c. incorporating said graphical representation into any existing graph stored in the lowest hierarchical memory section;

d. creating, for each successive hierarchical memory section, a graphical representation being the prior hierarchical memory's graphical representation with selected cycles represented as single nodes.

32. The method of operating a system according to claim 31 further comprising the step of analyzing operator generated data with the highest hierarchial memory.

33. The method of operating a system according to claim 32 further comprising the step of communicating via an output means, data indicative of the analysis of said operator generated input and said new data.

34. The method of operating a system according to claim 31 further comprising the steps of:
A. determining the relationship of the highest hierarchical memory with a predefined objective data; and,
B. manipulating a robotic device based upon said determination.

35. The method of operating a system according to claim 34 further comprising the step of updating said predefined objective data.

* * * * *